Jan. 2, 1923.
W. MEREDITH.
PROCESS OF AND APPARATUS FOR DEHYDRATING PETROLEUM EMULSIONS BY OSMOSIS.
FILED FEB. 14, 1921.
1,440,835.
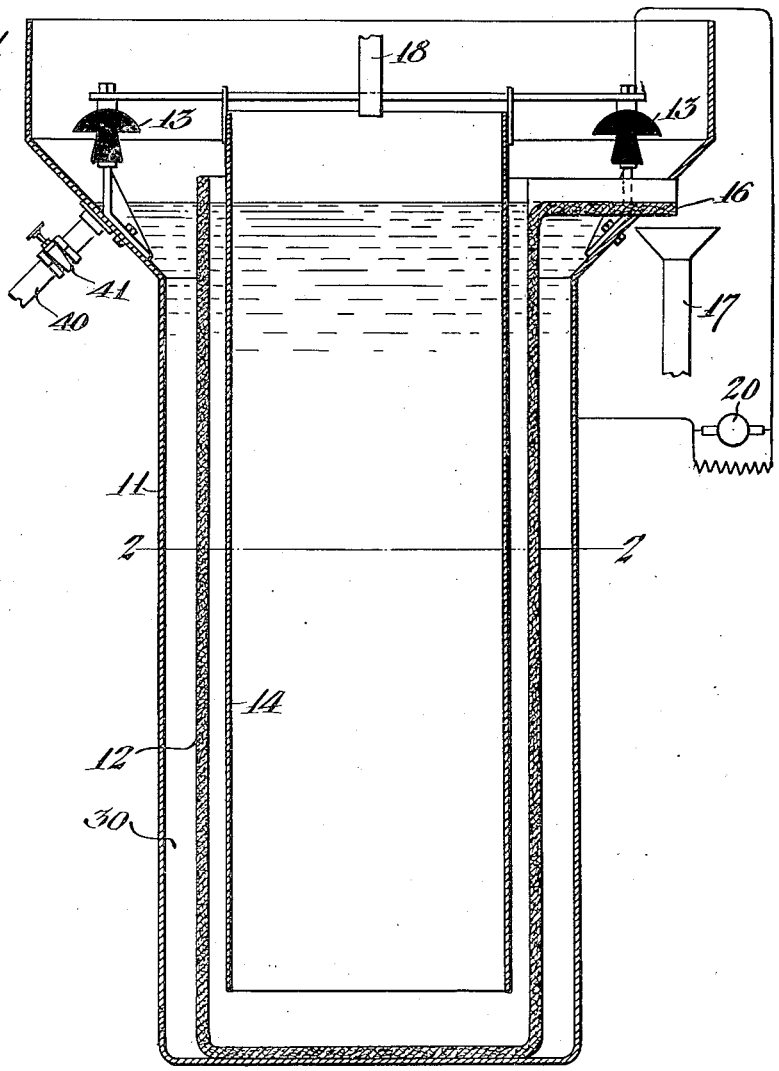
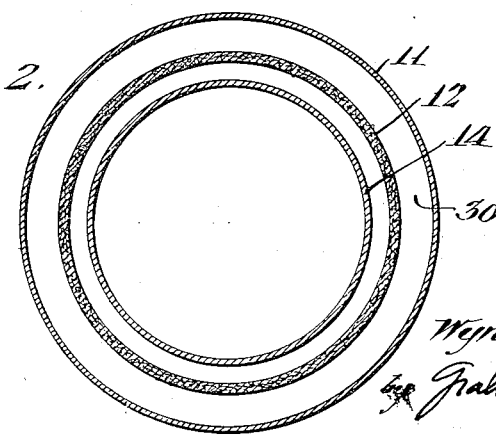

Patented Jan. 2, 1923.

1,440,835

UNITED STATES PATENT OFFICE.

WYNN MEREDITH, OF ALAMEDA, CALIFORNIA, ASSIGNOR TO PETROLEUM RECTIFYING COMPANY, OF SAN FRANCISCO, CALIFORNIA, A CORPORATION OF CALIFORNIA.

PROCESS OF AND APPARATUS FOR DEHYDRATING PETROLEUM EMULSIONS BY OSMOSIS.

Application filed February 14, 1921. Serial No. 444,946.

*To all whom it may concern:*

Be it known that I, WYNN MEREDITH, a citizen of the United States, residing at Alameda, county of Alameda, and State of California, have invented a new and useful Improvement Comprising the Process of and Apparatus for Dehydrating Petroleum Emulsions by Osmosis, of which the following is a specification.

My invention relates to the art of separating conducting material from material which is essentially non-conducting or of lesser conductivity and it is particularly applicable to the separation of water from petroleum or other emulsions.

It is a well known fact that, in the production, transportation, storage and refining of many oils and particularly petroleum oils, emulsions are formed with water which are extremely hard to reduce, one of the liquids being found in the form of minute drops or particles which float in the mass of the other liquid and which remain in suspension for indefinite periods. Various methods have been proposed to effect a separation of the two liquids. I have discovered that such a separation can be effected by osmosis and I have invented a process and apparatus utilizing this principle.

Referring to the drawing which is for illustrative purposes only,

Fig. 1 is a vertical cross section through an apparatus suited to the utilization of my invention.

Fig. 2 is a plan view on a plane represented by the line 2—2 of Fig. 1.

In the form of the invention illustrated, 11 is a metal tank or container which forms the positive electrode and inside of which is placed a second container 12 forming a porous septum or diaphragm and which may be formed of leather, unglazed porcelain or of wood. Hung on insulators 13 inside the container 12 is a metal cylinder 14 which forms the other electrode. Formed on the container 12 is a spout 16 which delivers cleaned oil to an outlet 17. An inlet pipe 18 is provided, delivering the emulsion to be cleaned into the top of the cylinder 14. The cylinder 14 is connected to the negative side of an electric source 20, or other source of electric current, the positive side of such source being connected to the tank 11. The electric source 20 may be either a direct current generator or a battery.

In practice the space between containers 11 and 12 is filled with a body of water 30, the interior of the container 12 being filled with emulsion up to the level of the spout 16 which is also the level of an outlet pipe 40 having a valve 41. The generator 20 is then started and a direct current passes through the porous diaphragm from the cylinder 14 through the emulsion, the porous diaphragm 12 to the water in the space outside the diaphragm 12 and to the tank 11. The passage of this current carries water particles from the emulsion through the porous diaphragm 12, the water being drawn off through the outlet pipe 40. The oil freed from its water rises to the top of the container 12. By allowing the emulsion to flow slowly through the pipe 18, cleaned oil is delivered to the pipe 17 and water to the pipe 40.

I claim as my invention:

1. A process of dehydrating emulsions of oil and water which comprises separating a body of emulsion from a body of water by a porous diaphragm and causing a direct current of electricity to flow of one polarity between said bodies.

2. A process of dehydrating emulsions of oil and water which comprises separating a body of emulsion from a body of water by a porous diaphragm and causing a direct current of electricity to flow of one polarity between said bodies, whereby the water particles of said emulsion are caused to pass through said diaphragm by osmosis.

3. An apparatus for dehydrating petroleum emulsions comprising a container; a porous diaphragm separating said container into two compartments; and means for causing a direct current of electricity to flow between said compartments.

4. An apparatus for dehydrating petroleum emulsions comprising a container; a porous diaphragm separating said container into two compartments; and means for causing a direct current of electricity to flow of one polarity between said compartments.

In testimony whereof, I have hereunto set my hand at San Francisco, California, this 7th day of February, 1921.

WYNN MEREDITH.